(12) United States Patent
Young et al.

(10) Patent No.: US 9,209,954 B2
(45) Date of Patent: Dec. 8, 2015

(54) METHOD AND APPARATUS FOR CONTROLLING CARRIER SELECTION IN WIRELESS COMMUNICATIONS SYSTEMS

(75) Inventors: Philip Young, Alton (GB); Peter Darwood, Bristol (GB)

(73) Assignee: SCA IPLA HOLDINGS INC, New York, NY (US)

( * ) Notice: Subject to any disclaimer, the term of this patent is extended or adjusted under 35 U.S.C. 154(b) by 80 days.

(21) Appl. No.: 14/126,118

(22) PCT Filed: Jun. 11, 2012

(86) PCT No.: PCT/GB2012/051310
§ 371 (c)(1),
(2), (4) Date: Jan. 15, 2014

(87) PCT Pub. No.: WO2012/172315
PCT Pub. Date: Dec. 20, 2012

(65) Prior Publication Data
US 2014/0126508 A1    May 8, 2014

(30) Foreign Application Priority Data

Jun. 15, 2011 (GB) .................................. 1110085.6

(51) Int. Cl.
*H04L 5/00* (2006.01)
*H04W 4/00* (2009.01)

(52) U.S. Cl.
CPC ............. *H04L 5/0053* (2013.01); *H04W 4/005* (2013.01)

(58) Field of Classification Search
CPC .............................. H04L 5/0053; H04W 4/005
See application file for complete search history.

(56) References Cited

U.S. PATENT DOCUMENTS

| | | |
|---|---|---|
| 2010/0008317 A1 | 1/2010 | Bhattad et al. |
| 2010/0105380 A1 | 4/2010 | Attar et al. |

(Continued)

FOREIGN PATENT DOCUMENTS

| | | |
|---|---|---|
| GB | 2 487 908 A | 8/2012 |
| WO | WO 2010/059813 A1 | 5/2010 |

(Continued)

OTHER PUBLICATIONS

Office Action issued Apr. 1, 2015 in United Kingdom Patent Application No. GB1110085.6 ($1^{st}$ and $2^{nd}$ page).

(Continued)

*Primary Examiner* — Jay P Patel
(74) *Attorney, Agent, or Firm* — Oblon, McClelland, Maier & Neustadt, L.L.P.

(57) ABSTRACT

A mobile communications system including: at least one base station configured to communicate data to/from different terminal devices via respective of plural logically separate carriers of a wireless access interface; first and second terminal devices operable to camp-on to first and second carriers of plural carriers and to subsequently communicate data with the at least one base station via the first and second carriers. The first and second carriers support compatible synchronization signalling such that the first and second terminal devices both can synchronize with the first and second carriers to begin a camp-on procedure. Following synchronization with one of the first or second carriers to begin the camp-on procedure, the second terminal device is configured to determine whether or not to continue with the camp-on procedure in dependence on an aspect of physical layer signalling associated with a control channel of the carrier with which it has synchronized.

19 Claims, 5 Drawing Sheets

(56) References Cited

U.S. PATENT DOCUMENTS

| | | | |
|---|---|---|---|
| 2010/0130218 A1 | 5/2010 | Zhang et al. | |
| 2010/0271175 A1* | 10/2010 | Chou et al. | 340/7.25 |
| 2011/0151887 A1 | 6/2011 | Hakola et al. | |
| 2012/0147844 A1* | 6/2012 | Kim et al. | 370/330 |
| 2012/0294694 A1* | 11/2012 | Garot | 411/427 |
| 2013/0010964 A1* | 1/2013 | Fong et al. | 380/277 |
| 2013/0343280 A1* | 12/2013 | Lee et al. | 370/328 |

FOREIGN PATENT DOCUMENTS

| | | | | |
|---|---|---|---|---|
| WO | WO 2011/021849 A2 * | 2/2011 | | H04W 74/08 |
| WO | WO 2011/070041 A1 | 6/2011 | | |

OTHER PUBLICATIONS

U.S. Appl. No. 14/126,203, filed Dec. 13, 2013, Young, et al.

United Kingdom Search Report issued Oct. 6, 2011 in Patent Application No. 1110085.6.

International Search Report issued Sep. 11, 2012 in PCT/GB2012/051310.

Harri Holma, et al., "LTE for UMTS OFDMA and SC-FDMA based radio access", John Wiley & Sons, Ltd., 2009, pp. 25-26 and cover pages.

NTT DOCOMO, "Initial access procedure for asymmetric wider bandwidth in LTE-advanced", 3GPP TSG RAN WG1 Meeting #55, R1-084249, XP050317534, Nov. 10-14, 2008, pp. 1-5.

* cited by examiner

METHOD AND APPARATUS FOR CONTROLLING CARRIER SELECTION IN WIRELESS COMMUNICATIONS SYSTEMS

CROSS-REFERENCE TO RELATED APPLICATIONS

The present application is based on PCT/GB2012/051310 filed Jun. 11, 2012, and claims priority to British patent application 1119975.6 filed in the UK IPO on Jun. 15, 2011, the entire contents of each of which are incorporated herein by reference.

BACKGROUND ART

The present invention relates to wireless communication systems and in particular to methods and apparatus for controlling carrier selection in wireless communication systems.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (i.e. MTC devices) communicating small amounts of data on a relatively infrequent basis. Examples include so-called smart meters which, for example, are located in a customer's home and periodically transmit data back to a central MTC server relating to the customer's consumption of a utility such as gas, water, electricity and so on.

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by a MTC-type terminal (e.g. simple collection and reporting of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers to implement. It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks.

SUMMARY OF THE INVENTION

According to a first aspect of the invention there is provided a mobile communications system comprising: an arrangement of at least one base station configured to communicate data to and/or from different types of terminal device via respective ones of a plurality of logically separate carriers of a wireless access interface; a first terminal device operable to camp-on to a first carrier of the plurality of carriers and to subsequently communicate data with the arrangement of at least one base station via the first carrier, and a second terminal device operable to camp-on to a second carrier of the plurality of carriers and to subsequently communicate data with the arrangement of at least one base station via the second carrier, wherein the first and second carriers support compatible synchronisation signalling such that the first and second terminal devices both have the ability to synchronise with the first and second carriers to begin a camp-on procedure, and wherein following synchronisation with one of the first or second carriers to begin a camp-on procedure, the second terminal device is configured to determine whether or not to continue with the camp-on procedure in dependence on an aspect of physical layer signalling associated with a control channel of the carrier with which it has synchronised.

The control channel may, for example, be a Physical Broadcast Channel (PBCH).

The aspect of physical layer signalling may comprise the presence or absence of an indicator. For example, the second carrier may be configured to broadcast the indicator and the first carrier may be configured to not broadcast the indicator.

The presence or absence of the indicator may be derivable from a Master Information Block of the carrier with which the second device has synchronised. For example, the presence or absence of the indicator may be derivable from information contained within the Master Information Block, and/or determined from signalling on a physical transmission resource derivable from the Master Information Block.

The aspect of physical layer signalling may comprise an indication of a carrier operating bandwidth for the carrier with which the second device has synchronised. In such a case the second device may be configured to not continue the camp-on procedure if the carrier operating bandwidth is greater than a device operating bandwidth for the second device.

The indication of the operating bandwidth of the carrier may, for example, be derivable from a Master Information Block of the carrier with which the second device has synchronised.

The second device may be configured to seek to synchronise with another carrier and begin another camp-on procedure in the event the second device determines to not continue with the camp-on procedure with a carrier with which it has synchronised.

In some embodiments the first and second carriers may employ incompatible physical layer signalling associated with control channels of their respective camp-on procedures such that the first terminal device is unable to complete a camp-on procedure with the second carrier.

According to another aspect of the invention there is provided a terminal device for use in a mobile communications system comprising an arrangement of at least one base station configured to communicate data to and/or from different types of terminal device via respective ones of a plurality of logically separate carriers of a wireless access interface; wherein the terminal device is operable to synchronise with one of the plurality of carriers to begin a camp-on procedure for that carrier, and wherein the terminal device is further operable to determine whether or not to continue with the camp-on procedure in dependence on an aspect of physical layer signalling associated with a control channel of the carrier with which it has synchronised.

According to another aspect of the invention there is provided a base station in a mobile communications system comprising an arrangement of at least one base station configured to communicate data to and/or from different types of terminal device via respective ones of a plurality of logically separate carriers of a wireless access interface; wherein the base station is operable to broadcast synchronisation signalling on a carrier in a format that allows two different types of terminal device to synchronise with the carrier to begin a camp-on procedure, and wherein the base station is further operable to broadcast a control channel on the carrier associated with the camp-on procedure, wherein an aspect of physical layer signalling associated with the control channel is selected to indicate to one of the two different types of terminal device whether or not that terminal device should continue with the camp-on procedure.

According to another aspect of the invention there is provided a method for assisting carrier selection in a mobile communications system comprising: an arrangement of at least one base station configured to communicate data to and/or from different types of terminal device via respective ones of a plurality of logically separate carriers of a wireless access interface; and in which a first terminal device is operable to camp-on to a first carrier of the plurality of carriers and to subsequently communicate data with the arrangement of at least one base station via the first carrier, and a second terminal device is operable to camp-on to a second carrier of the plurality of carriers and to subsequently communicate data with the arrangement of at least one base station via the second carrier, wherein the method comprises: broadcasting the first and second carriers with compatible synchronisation signalling such that the first and second terminal devices both have the ability to synchronise with the first and second carriers to begin a camp-on procedure; broadcasting a control channel on each of the carriers; and determining at a terminal device that has synchronised with one of the carriers to begin a camp-on procedure whether or not to continue with the camp-on procedure in dependence on an aspect of physical layer signalling associated with the control channel of the carrier with which it has synchronised.

According to another aspect of the invention there is provided a method for assisting carrier selection performed by a terminal device in a mobile communications system comprising an arrangement of at least one base station configured to communicate data to and/or from different types of terminal device via respective ones of a plurality of logically separate carriers of a wireless access interface; wherein the method comprises: synchronising with one of the plurality of carriers to begin a camp-on procedure for that carrier, and subsequently determining whether or not to continue with the camp-on procedure in dependence on an aspect of physical layer signalling associated with a control channel of the carrier with which the terminal device has synchronised.

According to another aspect of the invention there is provided a method for assisting carrier selection performed by a base station in a mobile communications system comprising an arrangement of at least one base station configured to communicate data to and/or from different types of terminal device via respective ones of a plurality of logically separate carriers of a wireless access interface; the method comprising: broadcasting synchronisation signalling on a carrier in a format that allows two different types of terminal device to synchronise with the carrier to begin a camp-on procedure; and broadcasting a control channel associated with the camp-on procedure on the carrier, wherein an aspect of physical layer signalling associated with the control channel is selected to indicate to one of the two different types of terminal device whether or not that terminal device should continue with the camp-on procedure.

According to another aspect of the invention there is provided a mobile communications system comprising: an arrangement of at least one base station configured to communicate data to and/or from different types of terminal device via respective ones of a plurality of logically separate carriers of a wireless access interface; a first terminal device operable to camp-on to a first carrier of the plurality of carriers and to subsequently communicate data with the arrangement of at least one base station via the first carrier, and a second terminal device operable to camp-on to a second carrier of the plurality of carriers and to subsequently communicate data with the arrangement of at least one base station via the second carrier, wherein the first and second carriers support compatible synchronisation signalling such that the first and second terminal devices can both synchronise with the first and second carriers to begin a camp-on procedure, but wherein the first and second carriers support incompatible physical layer signalling associated with control channels of their respective camp-on procedures such that the first terminal device is unable to complete a camp-on procedure with the second carrier.

It will be appreciated that features of the above-described aspects and embodiments of the invention may be combined with features of other aspects and embodiments of the invention as appropriate and in combinations other than those explicitly set out. For example, optional features of the first aspect of the invention may equally optionally be incorporated in embodiments according to other aspects of the invention, for example where the different aspects have corresponding features.

BRIEF DESCRIPTION OF THE DRAWINGS

Example embodiments of the present invention will now be described with reference to the accompanying drawings in which like parts have the same designated references and in which.

DETAILED DESCRIPTION

Figure 1:
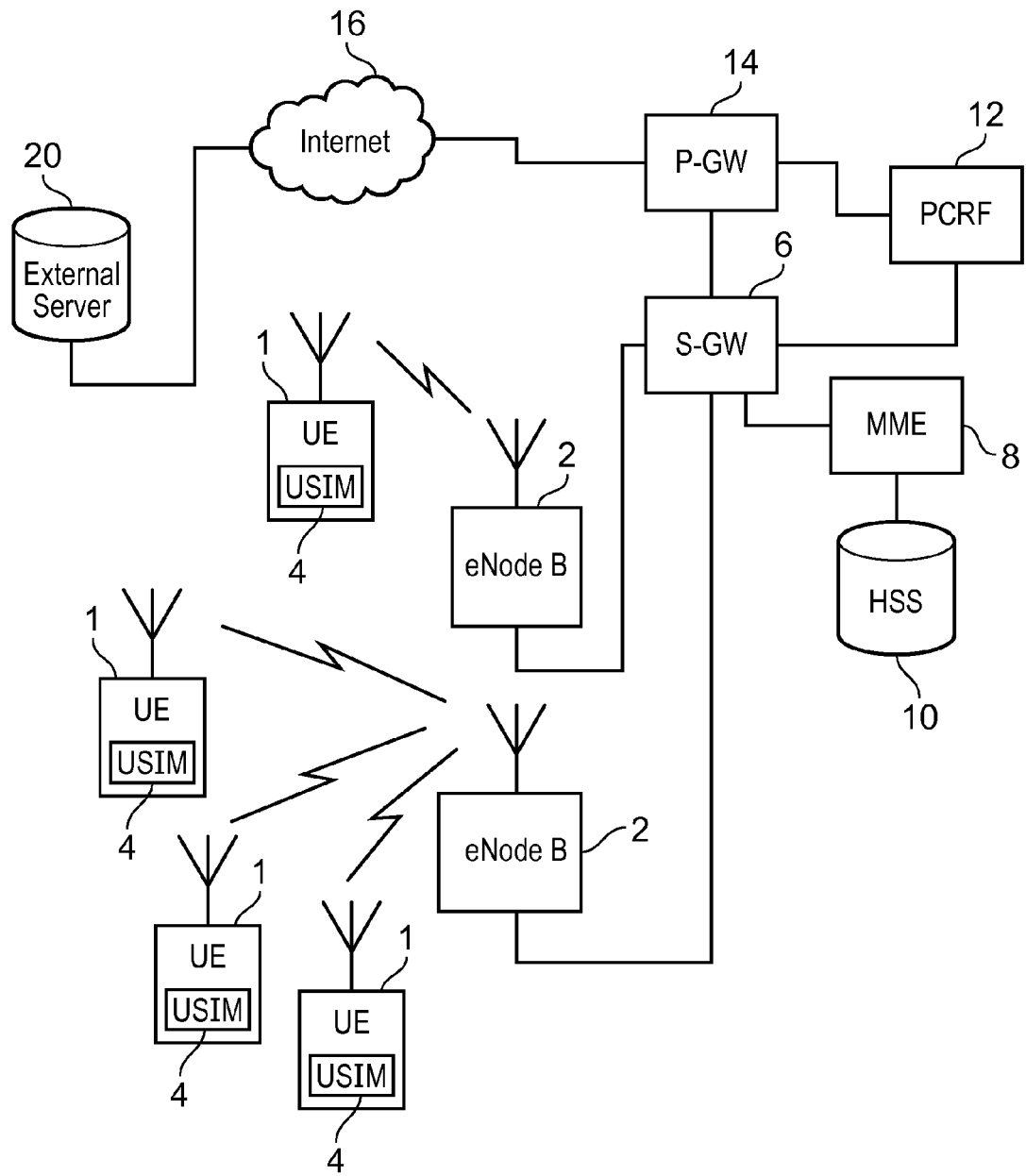
FIG. 1 is a schematic block diagram of a radio network and a plurality of user equipments forming a wireless communication system which operates in accordance with the 3GPP Long Term Evolution (LTE) standard.

As indicated above, there is a drive to provide radio network architectures that allow for the operation of a class of devices which may not be provided with the full operating functionality required for full compliance with a relevant operating standard of a radio network. By way of example, mobile user equipment that is fully compliant with the current LTE standards are required to support a radio bandwidth of 20 MHz. Radio resources may be allocated to the mobile user equipment across this entire bandwidth and so the mobile user equipment includes a transceiver able to operate across this full range. However, the present inventors have recognized there can be classes of device, such as MTC devices, that do not require such broadband capability, and as such could be made cheaper if they could be provided with a reduced bandwidth transceiver while still being accommodated in the network.

One way to achieve this interoperability would be to provide different carriers for different classes of device. For example, a first carrier might be provided for a first class of device complying with a given standard, while a second carrier might be provided for a second class of device complying with a variant of the given standard. For example, the first carrier may be a fully-compliant LTE carrier whereas the second carrier may be based on current LTE standards, but with a degree of modification to optimise the carrier for MTC-type device traffic. For example, the second carrier may operate over reduced bandwidth and be optimised to support relatively simple message traffic rather than the full-breadth of potentially content-rich traffic that may be communicated using first carrier. In this regard the second carrier in this example may in some respects be considered a kind of dedicated messaging network (DMN) for supporting communications to and from MTC-type devices. It will of course be appreciated that this DMN terminology is used here for ease of reference because it can characterise the type of traffic associated with a primary intended use for this kind of second carrier in some situations. Accordingly, the term DMN should not be intended as indicating the carrier is solely and exclusively only for communicating MTC-type device messages.

Thus a DMN may be characterized as being adapted to communicate relatively small messages more efficiently compared with a conventional broadband wireless communications carrier. For example, the DMN may support more Physical Downlink Control Channels (PDCCH) per subframe, by possibly reducing the size of the conventional PDCCH. In another example the DMN may be adapted to support a greater amount of Random Access Channel (RACH) resource, which may be useful for mobile devices that are not permanently connected to the DMN, but communicate in a connectionless manner.

Embodiments of the present invention are described herein with particular reference to an example implementation in a wireless communication system having carriers based around the 3GPP Long Term Evolution (LTE) standard.

FIG. 1 schematically shows an example architecture of an LTE system. The LTE system is provided by a telecommunications network operator to allow parties to communicate. As shown in FIG. 1, mobile communications devices designated as user equipment (UE) 1 are arranged to communicate data to and from base stations (transceiver stations) 2 which are frequently referred to in LTE as E-UTRAN NodeBs (e-nodeB). As shown in FIG. 1, each of the mobile communications devices 1 includes a Universal Subscriber Identity Module (USIM) 4 which includes information and parameters which allow the mobile communications devices to access the mobile radio network and to be authenticated for services to which the users have subscribed.

The e-nodeBs 2 are connected to a serving gateway S-GW 6 and to a mobility management entity (MME) 8 (the connections to the MME are not represented in FIG. 1 for simplicity). The S-GW 6 is arranged to perform routing and management of mobile communications services to the communications devices 1 in the mobile radio network. In order to maintain mobility management and connectivity, the mobility management entity (MME) 8 manages the evolved packet system (EPS) connections with the communications devices 1 using subscriber information stored in a home subscriber server (HSS) 10. Other core network components include the policy charging and resource function (PCRF) 12 a packet data gateway (P-GW) 14 which connects to an internet network 16 and finally to an external server 20. In the context of MTC communications a UE supporting MTC communications may, for example, be conveniently referred to as an MTC terminal or MTC UE, and a server with which the MTC terminal(s) communicate data may, for example, be conveniently referred to as an MTC server. More generally, devices in the system capable of supporting MTC communications may be referred to as MTC entities.

The various elements of FIG. 1 and their respective modes of operation are well-known and defined in the relevant standards administered by the 3GPP (RTM) body and also described in many books on the subject, for example, Holma H. and Toskala A [1]. These conventional aspects of LTE networks are not described further in the interest of brevity.

3GPP LTE Releases 8, 9 and 10 (Rel8/9/10) define 6 downlink transmission bandwidth configurations from 1.4 MHz to 20 MHz representing the use of 6, 15, 25, 50, 75 or 100 resource blocks. As noted above, all Rel8/9/10 terminal devices are required to support the maximum single carrier bandwidth of 20 MHz for compliance with the Rel8/9/10 standards. Nevertheless, for all bandwidth configurations Rel8/9/10 has specified that basic physical layer synchronisation signals (Primary Synchronisation Signals—PSS, and Secondary Synchronisation Signals—SSS), and the most fundamental system information (Master Information Block—MIB) is transmitted using only the central 6 resource blocks which are receivable with a 1.4 MHz transceiver. However, in order to receive the remainder of the carrier system information the terminal device is required to be able to receive the full bandwidth of the carrier.

However, and as also noted above, for some applications, for example in situations relating to machine type communications (MTC) and/or dedicated messaging networks (DMN), there is a drive to build low cost and hence low capability devices. Ideally, device simplification should permit a reduction in required bandwidth of operation as well as reduction of features and throughput. Terminal devices with a lower bandwidth capability than that specified for Rel8/9/10 may mean that such devices are unable to operate properly on Rel8/9/10 compliant networks which specify higher bandwidth capabilities. For example, terminal devices with a lower bandwidth capability may not even not be able to receive any more system information than that contained in the MIB of a Rel8/9/10 compliant network. This is not problematic if separate networks/carriers are provided for conventional Rel8/9/10 terminal devices and for the proposed new class of lower capability devices. This is because the operational characteristics of the carrier provided for the new class of lower capability devices can be modified away from the Rel8/9/10 standards to support the lower capability devices. Nonetheless, in this scenario there remains the issue of ensuring the different classes of device are able to identify and camp-on their intended carrier without significantly impacting the operation of other carriers. For example, low capability devices will ideally be able to find and camp-on the carrier associated with their target dedicated messaging network(s) even in the presence of Rel8/9/10 higher bandwidth carriers. Furthermore, there is a desire that DMN carriers are not swamped by Rel8/9/10 capable devices camping-on the DMN, even though the Rel8/9/10 capable devices are in the coverage area of a higher bandwidth Rel8/9/10 carrier which they could otherwise use.

Thus, in a scenario comprising co-located or over-lapping carriers, for example a first carrier that is a high(er) bandwidth LTE Rel8/9/10 carrier and a second carrier that is associated with a low(er) bandwidth dedicated messaging network (DMN), the inventors have recognized there will be a drive for mechanisms of ensuring that the low capability/low bandwidth (i.e. DMN) devices are able to locate and select the DMN carrier(s), while at the same time to ensure that the Rel-8/9/10 capable devices are able to select (or are directed towards) the carrier(s) able to support their traffic patterns without putting undue load upon the DMN(s).

Before turning to some of the ways the inventors have recognised for addressing this issue, some terminology that will is used herein to aid explanation is first introduced.

Various embodiments of the invention are generally concerned with how a first and a second class of device can select from a first and a second carrier in an appropriate way, for example, during a camp-on/cell selection procedure. In some of the particular examples considered here, the first class of device and the first carrier are compliant with particular standards, for example, LTE Rel8/9/10 standards, and the second class of device and the second carrier are compliant with modified versions of these particular standards, for example, based on versions of the standards modified to support lower-capability devices. Accordingly, and purely for the sake of reference and to aid explanation, the first class of device and the first carrier may be referred to here in some examples as legacy devices and legacy carrier, while the second class of device and the second carrier may be referred to in some examples as DMN devices and DMN carrier (or in alternative MTC devices and MTC carrier). However, it will be appreciated that these terms are simply used as labels for ease of explanation of particular implementations of embodiments of the invention for distinguishing the two classes of device and carrier. Thus, the term "legacy" should not be considered as indicating any form of obsolescence, and indeed the devices and carrier(s) referred to here as legacy devices and carrier(s) may equally correspond with devices and carrier(s) that comply with future releases of the LTE standards, for examples Rel11 and beyond. Equally, and as already noted above, DMN should not be taken to refer to a network which exclusively supports only basic messaging services. Furthermore, the second class of device and second carrier that are described here as not being fully compliant with the operating standards of the first class of device and first carrier (for example because of reduced capability) may nonetheless be compliant with their own standards. Furthermore, the functionality described herein as regards both the first and second classes of device and carriers might comply with different aspects of a future standard, for example a future release of the LTE standards.

Figure 2:
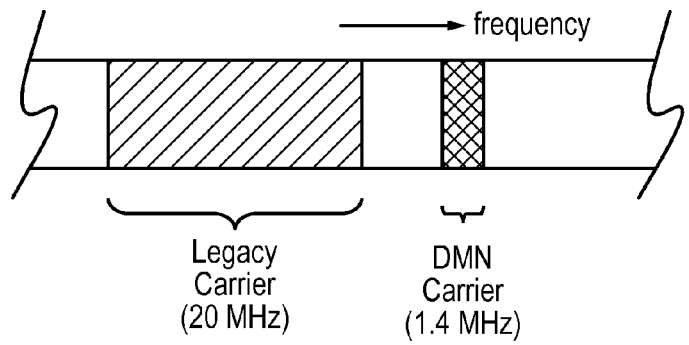
FIG. 2 schematically represents a radio network bandwidth allocation from within a portion of the available spectrum for two carriers implementing cell selection procedures according to an embodiment of the invention.

FIG. 2 schematically indicates how a legacy carrier and a DMN carrier might be allocated bandwidth within an available spectrum for mobile radio communications. In this example the legacy carrier has a bandwidth of 20 MHz and the DMN carrier has a bandwidth of 1.4 MHz, the DMN carrier is at a higher frequency and the two carriers are not immediately adjacent. It will, however, be appreciated that this simply reflects one example configuration and other embodiments may adopt different carrier bandwidths and relative carrier placements in the available spectrum.

For the purposes of the following explanation, it is assumed the legacy carrier is a LTE Rel10 carrier and the DMN carrier has some aspects in common with the LTE Rel10 carrier, but some aspects which are different in order to optimise its operation having regard to the particular subset of traffic type is it intended to primarily support (for example sporadic short message traffic). In principle the DMN could be configured to operate in a fundamentally different manner to the legacy network with no cross-compatibility or similarity of operation. However, legacy-type networks are well specified and many of the associated operational aspects are optimised and equally suited to DMN carriers. Basing a DMN carrier at least broadly on the same principles as existing networks also allows for easier roll-out and introduction of such new types of network than might otherwise be the case. For example, in some of the specific embodiments described below it is assumed the DMN and legacy networks share the same synchronisation signal structure and the same Physical Broadcast Channel (PBCH) structure as specified for LTE Rel8/9/10 carriers. However, the specific details of how the DMN might differ from the LTE Rel10 network in terms of it normal operation do not significantly affect the camp-on procedures described below.

There are two sides to the issue of proper cell selection (i.e. choosing between the legacy and DMN carrier) during camp-on and these will be described in turn. The first side relates to cell selection by DMN devices intending to camp-on to a DMN carrier and the second side relates to cell selection by legacy devices intending to camp-on to a legacy carrier.

Figure 3A:
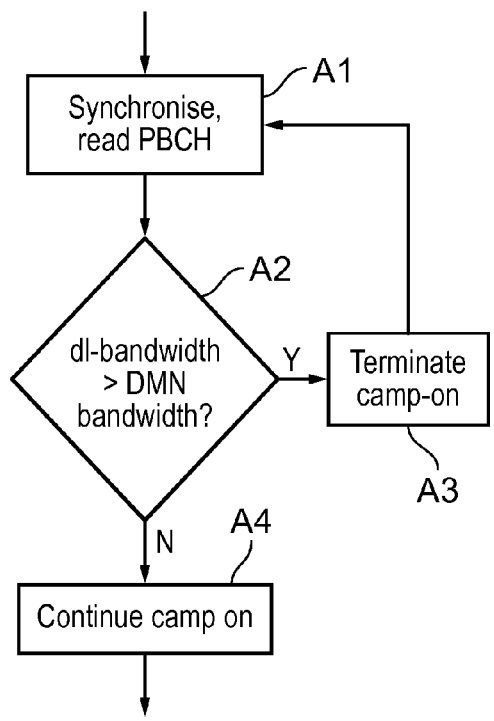
FIGS. 3A and 3B are flow diagrams schematically showing some aspects of a cell selection procedure performed by a mobile terminal device in accordance with some embodiments of the invention.

Carrier Selection by DMN Devices:

FIG. 3A is a flow diagram schematically showing some aspects of a cell selection procedure to be performed by a DMN device according to an embodiment of the invention.

A DMN device seeking to camp-on to a carrier, for example following power-up, seeks to identify and decode PSS and SSS signalling being broadcast in its location. Once the DMN device synchronises to a carrier using the PSS and SSS, the DMN device determines the frame timing and proceeds to decode the PBCH to determine the MIB for the carrier. It is assumed here the legacy and DMN carriers employ the same PSS, SSS and PBCH structures such that the DMN device may perform this synchronisation and PBCH decoding process in the known manner set out in the relevant standards. This synchronisation and PBCH decoding step is represented by Step A1 in FIG. 3A.

In Step A2 the DMN device derives the carrier bandwidth (dl-bandwidth) from the information signalled in the MIB and determines whether this is compatible with the DMN device's bandwidth operating capability. That is to say the DMN device is aware of its operating bandwidth (for example 1.4 MHz), and can compare this with the signalled bandwidth of the carrier the DMN device is seeking to camp-on to. Referring to the example bandwidth allocation shown in FIG. 2, if the DMN device has synchronised to the legacy carrier, the dl-bandwidth signalled on the MIB would indicate a carrier bandwidth of 20 MHz, whereas if the DMN device has synchronised to the DMN carrier, the dl-bandwidth signalled on the MIB would indicate a carrier bandwidth of 1.4 MHz.

If in Step A2 the DMN device determines the signalled carrier bandwidth is greater than the DMN device's operating bandwidth, the DMN device assumes it is seeking to camp-on to a network intended for legacy devices and processing follows the branch marked "Y" to step A3 where the DMN device terminates the present camp-on procedure and seeks to camp-on to another carrier by returning to Step A2 to seek to synchronise with and decode PBCH for a different carrier.

However, if in Step A2 the DMN device determines the signalled carrier bandwidth is not greater than the DMN device's operating bandwidth, the DMN device assumes it is seeking to camp-on to a network intended for DMN devices and processing follows the branch marked "N" to step A4 where the camp-on procedure continues, for example, following broadly conventional techniques for radio carrier camp-on procedures.

Thus in accordance with the principles of the process of FIG. 3A, a class of device seeking to select a carrier from among multiple carriers is configured to synchronise with one of the carriers and to determine an operating bandwidth for the carrier from information signalled in a Master Information Block broadcast for the carrier, and to proceed with the selection of that carrier based on a value for the operating bandwidth for the carrier.

Figure 3B:
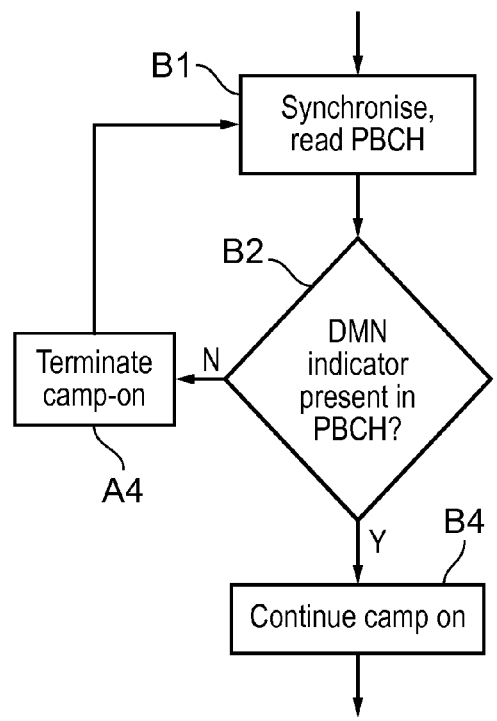

FIG. 3B is a flow diagram schematically showing some aspects of a cell selection procedure to be performed by a DMN device according to another embodiment of the invention.

Step B1 of FIG. 3B is similar to and will be understood from the above description of corresponding Step A2 in FIG. 3A. However, in accordance with process of FIG. 3B, a DMN carrier is configured to broadcast a specific indication that the carrier is associated with a DMN and the DMN devices that may wish to camp-on to the carrier are configured to seek this indicator as confirmation of the suitability of the network. For example, a DMN indicator flag may be signalled in one (or more) of the MIB bits that are spare in LTE Rel8/9/10 (currently there are 10 bits spare). This would allow the DMN device to decide if to proceed with camp-on (or not) immediately following the decoding of the MIB. In another example, a DMN indicator flag may not be signalled in the MIB itself, but may instead be broadcast in a predefined (or derivable according a predefined scheme—e.g. based on dl-bandwidth) transmission resource, such as a particular time/frequency or time/frequency offset relative to, for example, the MIB.

Thus in Step B2 the DMN device determines if the carrier is broadcasting a DMN indicator/flag. In this example, and as indicated in FIG. 3B, it is assumed the DMN is configured to signal the DMN indicator in the MIB on PBCH, but as noted above, a flag could equally be signalled outside the PBCH. Nonetheless, a significant aspect of some embodiments of the invention in this regard is that the presence of DMN indicator is derivable by the DMN device before it is required to decode any system information block (SIB) of the carrier since this can reduce the time taken for the DMN device to determine if it is seeking to camp-on the "wrong" carrier.

If in Step B2 the DMN device determines the carrier does not include the predefined DMN indicator, the DMN device assumes it is seeking to camp-on to a carrier intended for legacy devices and processing follows the branch marked "N" to step B3 where the DMN device terminates the present camp-on procedure and seeks to camp-on to another carrier by returning to Step B2 to seek to synchronise with and decode PBCH for a different carrier.

However, if in Step B2 the DMN device determines the carrier does include an expected DMN indicator, the DMN device assumes it is seeking to camp-on to a carrier intended for DMN devices and processing follows the branch marked "Y" to step B4 where the camp-on procedure continues, for example, following broadly conventional techniques for radio carrier camp-on procedures.

Thus in accordance with the principles of the process of FIG. 3B, a class of device seeking to select a carrier from among multiple carriers is configured to synchronise with one of the carriers and to determine if the carrier is broadcasting an indicator which indicates the network is suitable for being selected by that class of device. The indicator of the class of device for which the network is suitable may be communicated before a device decodes any SIBs, for example, it may be included on the PBCH, or at a specific or derivable transmission resource set aside for communicating the indicator on a carrier intended for the relevant class of device.

It will be appreciated that some example implementations of embodiments of the invention may combine aspects of FIGS. 3A and 3B together. For example, implementing both procedures in sequence may provide a more robust carrier selection scheme for DMN devices. For example, aspects of the process described with reference to FIG. 3B may be incorporated in a an implementation based on the process described with reference to FIG. 3A to help distinguish between carriers in the event there may also be legacy carriers having relatively small bandwidths.

Carrier Selection by Legacy Devices:

In principle similar techniques to those described above in relation to carrier selection by DMN devices could be correspondingly applied in the context of devices seeking to camp-on to a legacy carrier. However, an issue here is the above-described DMN device carrier selection mechanisms rely to some extent on modified behaviour on behalf of the DMN devices/carrier from that currently specified in the relevant standards, such as LTE Rel8/9/10. For example, there is no provision in the current standards for a user terminal to seek a device-class indicator of the kind discussed above in relation to FIG. 3B, or to modify camp-on behaviour based on a value for dl-bandwidth signalled in MIB, such as discussed above in relation to FIG. 3A. Accordingly different approaches are proposed below to assist legacy devices compliant with existing standards to properly select a legacy carrier against the presence of DMN carriers without requiring behavioural or signalling modifications in the legacy devices or carrier(s).

In view of this, the process by which a legacy device camps-on to the legacy carrier may proceed in a wholly conventional manner, and the mechanisms described below primarily focus on procedures for preventing legacy device from seeking to camp-on to the DMN carrier. What is more, this is done with a view, at least in some embodiments, towards rejecting legacy devices from the DMN carrier early in the camp-on procedure.

In principle a DMN carrier could adopt a new synchronisation signalling scheme that is not compliant with LTE Rel8/9/10 so that a legacy device might not be able to even attempt to begin camping-on to a DMN carrier. However, as noted above, there are reasons why it may be preferable to maintain some levels of basic of compatibility between the legacy and DMN carriers. With this in mind, a DMN carrier could in principle adopt a camp-on procedure that is fully compliant with existing, e.g. LTE Rel/8/9/10, camp-on procedures and allow legacy device to complete registration in the DMN in the normal way before re-directing them to a legacy carrier. However, this reduces the flexibility for allowing the camp-on procedure for DMN devices to be optimised having regard to the different characteristics of the DMN and legacy network traffic patterns and device requirements. That is to say, this approach may require the DMN carrier to support more compatibility with legacy carriers than might be desired for some implementations. In addition, allowing legacy device to complete a camp-on procedure for a DMN carrier before being directed away leads to an increased overall signalling load for the DMN, and also delays in the registration procedure, which can be frustrating for users.

Accordingly, the inventors have recognised that in some cases it may be preferable to prevent legacy devices from camping-on a DMN carrier at different stages of the camp-on procedure according to the extent to which the DMN is desired to be compliant/backward compatible with the legacy network—i.e. based on what degree of compatibility is desired between the respective carriers for the respective classes of device. The inventors have thus established various different mechanisms for preventing devices of a first class/type (e.g. legacy devices) from camping-on to carriers primarily intended for use by devices of a second class/type (e.g. DMN/MTC type devices) at different stages of a comp-on procedure, and in particular a camp-on procedure that would be followed by a user terminal conforming to LTE Rel8/9/10.

Thus the inventors have identified various different techniques that may be used at different stages of the LTE Rel8/9/10 camp-on procedure to prevent a class of device which is compliant with these camp-on/cell selection procedures from completing the camp-on/cell selection procedures of a DMN. These different techniques are described below broadly in order of how early they might be applied in a camp-on procedure. It will be appreciated that various ones of these techniques may be used individually or in combination with other ones of the techniques as appropriate, for example, to provide multiple different ways for preventing legacy devices from camping-on to a DMN carrier.

The different techniques may for the purposes of explanation be broadly considered to fall into three groups. The groups might be referred to as (1) Physical layer checks, (2) System Information Block 1 (SIB1) checks; and (3) Initial Access checks, and the different techniques are described below in broadly this order. In describing these techniques reference will be made to various aspects of conventional camp-on procedures, and particular embodiments will be exemplified in this regard by reference to the established cell selection/camp-on procedures of LTE Rel8/9/10. The general cell selection procedures associated with LTE Rel8/9/10 and associated terminology and acronyms are well known and well defined in the relevant standards and so are not described in detail here in the interest of brevity. It will be assumed for the majority of embodiments described below that legacy device(s)/carrier(s) are configured to follow the established cell selection/camp-on procedures of LTE Rel8/9/10, and that DMN device(s)/carrier(s) are also configured to follow the same general principles and stages of these cell selection/camp-on procedures, but with modifications/differences to cause the desired behaviour. In particular the description of the following embodiments focuses on how the cell selection/camp-on procedures for a DMN carrier might differ from the cell selection/camp-on procedures for a legacy carrier in order to prevent a legacy device from camping-on to the DMN carrier without requiring the legacy device to behave in a way which is different from its own camp-on procedures.

Physical Layer Checks for Carrier Selection by Legacy Devices:

One mechanism to help prevent a legacy device from camping-on a DMN carrier would be to configure the DMN carrier so the MIB (PBCH) of the DMN carrier was differently encoded/scrambled compared to the MIB (PBCH) of a legacy carrier. It is assumed here the legacy and DMN carriers employ the same synchronisation signalling procedures (e.g. PSS and SSS) so that both classes of device can synchronise to both types of carrier, e.g. following the defined LTE Rel8/9/10 synchronisation procedures. However, the different coding for the MIB on the DMN carrier would impede a legacy device's ability to access this MIB, and hence after a device dependent number of attempts it would terminate its camp-on procedure for that particular carrier in accordance with the defined behaviour for a LTE Rel8/9/10 device in these circumstances and seek another carrier. A DMN device, on the other hand, could be configured with the ability to decode the differently encoded/scrambled MIB of a DMN carrier so that the DMN device is able to decode the MIB and proceed with the camp-on procedure.

In some implementations DMN devices may be configured with the ability, (e.g., knowledge of the relevant decoding scheme(s), to decode the MIB of DMN carriers, but not the MIB of legacy carriers. Thus this mechanism may be used to prevent both classes of device from camping-on the "wrong" type of carrier (i.e. a carrier primarily intended for the other class of device). In other implementations DMN devices may be configured with the ability to decode the respective MIBs of both legacy and DMN carriers. This would allow, for example, DMN devices to use a legacy carrier as a fall-back if a suitable DMN carrier was not available. For example, DMN devices could be configured to first try to camp-on a DMN carrier by performing cell selection assuming a DMN coding scheme for the MIB, and then if the DMN device does not succeed in camping-on a DMN carrier after a given time or number of attempts it may revert to seek to camp-on a legacy carrier.

Figure 4A:
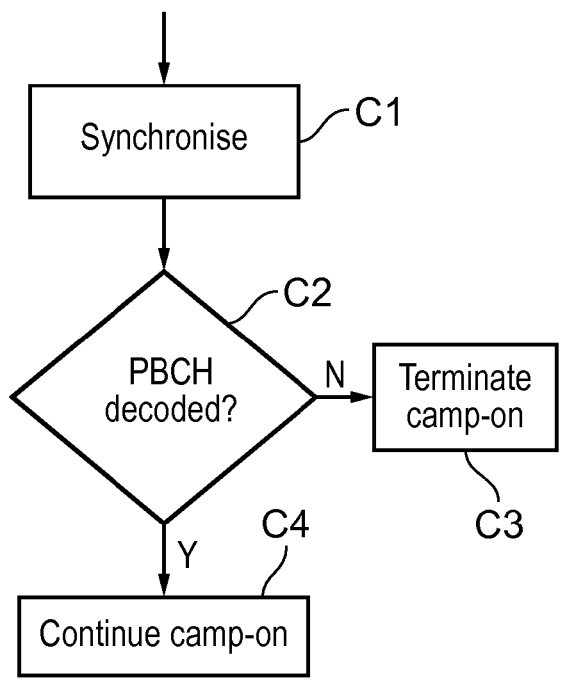
FIGS. 4A to 4C are flow diagrams schematically showing some aspects of a cell selection procedure performed by a mobile terminal device in accordance with some other embodiments of the invention.

FIG. 4A is a flow diagram schematically showing some steps of how a legacy device may behave in seeking to camp-on to a carrier in a telecommunications system comprising both legacy and DMN type carriers in accordance with a frustrated MIB acquisition approach.

A legacy device seeking to camp-on to a carrier, for example following power-up, seeks to identify and decode PSS and SSS signals being broadcast in its location. As noted above, it is assumed here the legacy and DMN carriers use compatible synchronisation signalling such that the legacy device is able to synchronise with both types of carrier. This synchronisation step is represented by Step C1 in FIG. 4A.

In Step C2 the legacy device seeks to decode PBCH to read the MIB.

If in Step C2 the legacy device fails to read the MIB, for example, because the carrier is a DMN carrier implementing a different PBCH coding scheme from that specified in accordance with the legacy device's operating standards, the legacy device will in accordance with the LTE Rel8/9/10 standards terminate its attempt to camp-on to the present carrier. This is schematically represented in FIG. 4A by the processing branch marked "N" leading to step C3 where the device terminates the present camp-on procedure and seeks to camp-on to another carrier.

However, if the carrier with which the legacy device synchronised in Step C1 is a legacy carrier, the device will be able to decode the MIB on PBCH in Step C2 in the normal way (assuming there is not some unrelated problem) and processing will follow the "Y" branch from Step C2 to Step C4 where the device's camp-on procedure may continue following conventional techniques.

Thus in accordance with the principles of the process of FIG. 4A, a telecommunication system comprises two types of carrier for supporting two classes of device and the synchronisation procedures for the two types of carrier are compatible with one another, but the procedures for reading a Master Information Block for each of the carriers are not compatible. Thus a first class of device can synchronise with both types of carrier, but is not able to read basic carrier information, such as carrier bandwidth, system frame number, and PHICH configuration, for one of the two types of carrier and so is prevented from completing the camp-on procedure for this carrier. Significantly, this is achieved at an early stage in the camp-on procedure and can be achieved without requiring any modification in the behaviour of the first class of device.

Another mechanism to help prevent a legacy device from camping-on a DMN carrier would be to configure the DMN carrier so the PCFICH was differently encoded/scrambled compared to the PCFICH of a legacy carrier. In such a case, legacy and DMN carriers may employ the same synchronisation signalling procedures and PBCH coding so that both classes of device can synchronise to both types of carrier and read the respective MIBs, e.g. following the defined LTE Rel8/9/10 synchronisation procedures. However, the different coding for the PCFICH on the DMN carrier would impede a legacy device's ability to proceed beyond this stage of the camp-on procedure. A DMN device, on the other hand, could be configured with the ability to decode the modified PCFICH of a DMN carrier so that the DMN device is able to do this and proceed with the camp-on procedure. In some cases the PCFICH of the DMN carrier may be encoded in the same way as for the legacy carrier, but the corresponding Control Format Indicator (CFI) for a DMN carrier may adopt a predefined value that the legacy device can read, but which prevents the legacy device from proceeding with the camp-on procedure. For example, the DMN carrier may adopt a reserved CFI of the legacy carrier, for example, a CFI codeword corresponding to all zeroes.

As for the MIB on PBCH discussed above, and for the same reasons, in some implementations a DMN device may be configured with the ability to properly decode only the PCFICH of DMN carriers, and in other implementations a DMN device may be configured with the ability to properly decode the respective PCFICHs of both legacy and DMN carriers.

Figure 4B:
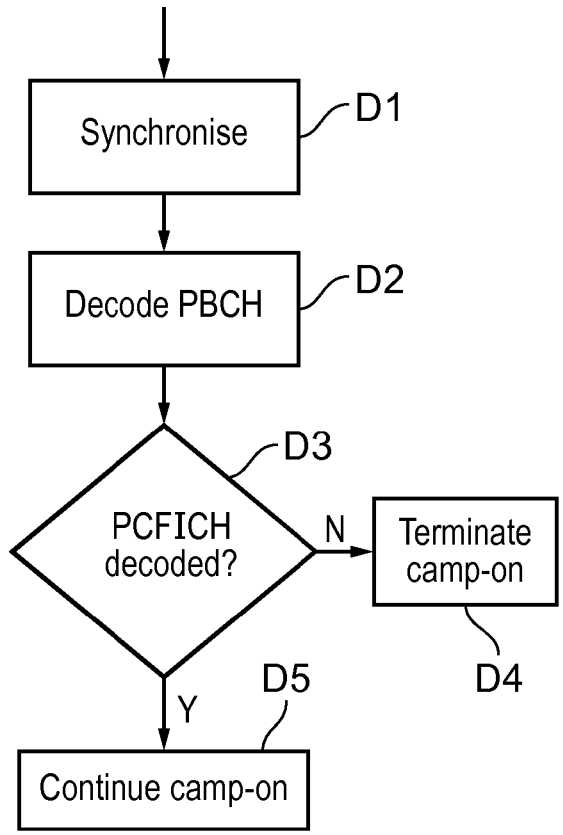

FIG. 4B is a flow diagram schematically showing some steps of how a legacy device may behave in seeking to camp-on to a carrier in a telecommunications system comprising both legacy and DMN type carriers in accordance with a frustrated PCFICH decoding approach.

A legacy device seeking to camp-on to a carrier, for example following power-up, seeks to identify and decode PSS and SSS signals being broadcast in its location. As noted above, it is assumed here the legacy and DMN carriers use compatible synchronisation signalling such that the legacy device is able to synchronise with both types of carrier. This synchronisation step is represented by Step D1 in FIG. 4B.

After synchronising with the carrier, the legacy device seeks to decode PBCH to read the carrier MIB. As noted above, it is assumed in this example the legacy and DMN carriers use compatible PBCH coding so the legacy device is able to read the MIB on both types of carrier. This PBCH decoding step is represented by Step D2 in FIG. 4B.

In Step D3 the legacy device seeks to decode PCFICH to read the CFI.

If in Step D3 the legacy device fails to read the CFI, for example, because the carrier is a DMN carrier implementing a different PCFICH coding scheme from that specified in accordance with the legacy device's operating standards, the legacy device will in accordance with the LTE Rel8/9/10 standards terminate its attempt to camp-on to the present carrier. This is schematically represented in FIG. 4B by the processing branch marked "N" leading to step D4 where the device terminates the present camp-on procedure and seeks to camp-on to another carrier.

However, if the carrier with which the legacy device synchronised in Step D1 is a legacy carrier, the device will be able to determine the CFI on PCFICH in Step D3 in the normal way (assuming there is not some unrelated problem), and processing will follow the "Y" branch from Step D3 to Step D5 where the device's camp-on procedure may continue following conventional techniques.

Thus in accordance with the principles of the process of FIG. 4B, a telecommunication system comprises two types of carrier for supporting two classes of device. The synchronisation procedures and MIB coding for both types of carrier are compatible with one another, but the procedures for determining a useable CFI (i.e. useable in the sense of allowing the camp-on procedure to proceed) are not compatible. Thus a first class of device can synchronise with both types of carrier and read basic carrier information, such as carrier bandwidth, for the two types of carrier, but the first class of device is unable to read a useable indication of control format for one of the types of carrier. This might be because this carrier uses a different encoding/scrambling scheme for communicating the CFI, or because the carrier adopts a control format indicator that is a reserved (i.e. non-useable) indicator for the first class of device. A device of the second class, on the other hand, may be configured to properly decode the PCFICH/ determine a useable CFI, thereby allowing devices of the second class to proceed with camping-on the second type of carrier. For example a device of the second class may be configured to take account of the different coding scheme for the CFI on the second type of carrier, or, in the case of the CFI being coded in the same way, but set to a reserved codeword of the first class of device, to determine a valid CFI following detection of the reserved value. For example, a DMN carrier may be defined to operate with a fixed control format so the true CFI is in effect predefined. Alternatively the DMN carrier may be configured to communicate CFI information to replace the reserved value initially used to indicate the carrier as a DMN carrier in a separate transmission newly-defined for DMN carriers.

Another mechanism to help prevent a LTE-compliant legacy device from camping-on a DMN carrier would be to configure the DMN carrier so System Information Block type 1 (SIB1) on the DMN carrier could not be decoded by legacy devices. In accordance with established camp-on procedures for LTE Rel8/9/10, a device which is unable to acquire SIB1 would treat the cell as barred and perform cell re-selection. A DMN device, on the other hand, could be configured with the ability to read the modified SIB 1 on a DMN carrier and so proceed with the camp-on procedure.

For example, in accordance with LTE Rel8/9/10, SIB1 is transmitted on a downlink carrier at specified times relative to a system frame number transmitted in the MIB. However the specific frequency resource and transport block size used are signalled using PDCCH signalling in a conventional manner in which the CRC has been scrambled with the system information (SI) RNTI (all ones (FFFF) in Rel8/9/10). Thus there are a number of ways in which the signalling of SIB1 on a DMN carrier could be modified as compared to a legacy carrier in order to prevent a legacy device from properly acquiring SIB1 on the DMN carrier. For example, PDCCH for SIB 1 on a DMN carrier could be transmitted at different times (relative to the system frame number) as compared to PDCCH for SIB 1 on a legacy carrier. Alternatively, or in addition, different PDCCH formats could be used for SIB 1 on the two different types of carrier to prevent legacy devices from the acquiring SIB 1 contents on PDSCH for a DMN carrier, for example, a different CRC scrambling, or other different coding/scrambling procedure, could be used.

In common with all these techniques, DMN devices may be configured with the ability to camp-on to both types of carrier or just DMN carriers. For example, a DMN device may be configured with the ability to acquire SIB 1 on DMN carriers, but not on legacy carriers. Accordingly, and as with the other techniques, this mechanism may be used to prevent device of either class from camping-on the "wrong" type of carrier (i.e. a carrier primarily intended for the other class of device). In other implementations DMN devices may be configured with the ability to acquire SIB1 for both legacy and DMN carriers. This would allow, for example, DMN devices to use a legacy carrier as a fall-back if a suitable DMN carrier was not available.

In some respects an approach based on frustrating the acquisition of SIB1 for legacy devices trying to camp-on a DMN carrier might introduce more latency compared to some of the other techniques discussed herein because delays may be introduced before a legacy device concludes that it cannot acquire SIB1 and performs cell re-selection. On the other hand from the viewpoint of design of the DMN carrier it does not require that SIB1 be signalled in a backwards compatible manner.

Figure 4C:
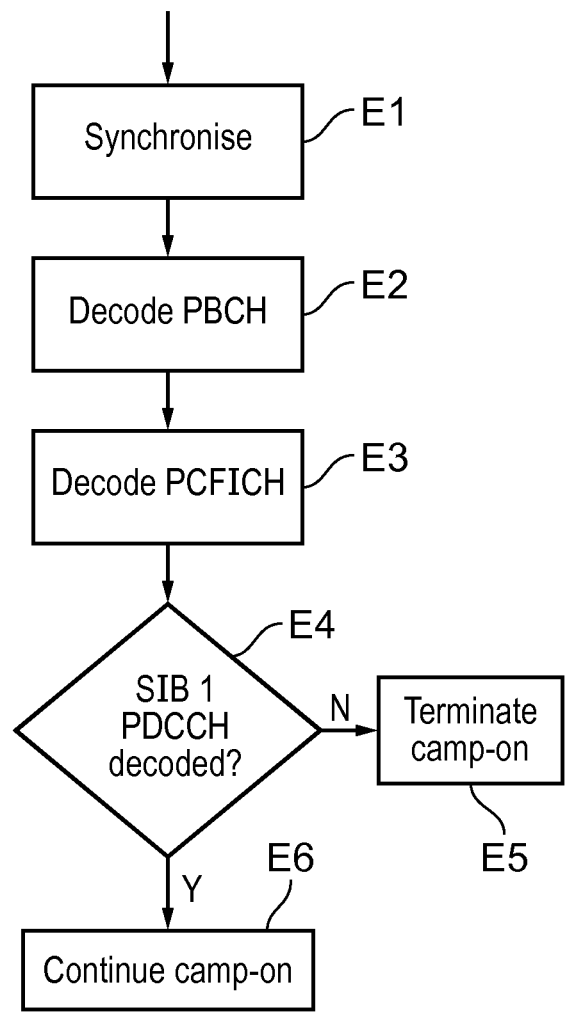

FIG. 4C is a flow diagram schematically showing some steps of how a legacy device may behave in seeking to camp-on to a carrier in a telecommunications system comprising both legacy and DMN type carriers in accordance with this frustrated SIB 1 acquisition approach.

A legacy device seeking to camp-on to a carrier, for example following power-up, seeks to identify and decode PSS and SSS signals being broadcast in its location. Again it is assumed here the legacy and DMN carriers use compatible synchronisation signalling such that the legacy device is able to synchronise with both types of carrier. This synchronisation step is represented by Step E1 in FIG. 4C.

After synchronising with the carrier, the legacy device seeks to decode PBCH to read the carrier MIB. Again it is assumed in this example the legacy and DMN carriers use compatible PBCH coding so the legacy device is able to read the MIB on both types of carrier. This PBCH decoding step is represented by Step E2 in FIG. 4C.

After obtaining the MIB, the legacy device seeks to decode PCFICH to read the carrier CFI. It is further assumed in this example the legacy and DMN carriers use compatible PCFICH coding so the legacy device is able to read the CFI on both types of carrier. This PCFICH decoding step is represented by Step E3 in FIG. 4C.

In Step E4 the legacy device seeks to acquire SIB1.

If in Step E4 the legacy device fails to acquire SIB1, for example, because the corresponding PDCCH signalling is not present at the expected times, or the PDCCH information is differently coded from what the legacy device expects (e.g. it uses a different SI-RNTI), the legacy device will in accordance with the LTE Rel8/9/10 standards terminate its attempt to camp-on to the present carrier. This is schematically represented in FIG. 4C by the processing branch marked "N" leading to step E5 where the device terminates the present camp-on procedure and seeks to camp-on to another carrier.

However, if the carrier with which the legacy device synchronised in Step E1 is a legacy carrier, the device will be able to acquire SIB1 in Step E4 in the normal way, and processing will follow the "Y" branch from Step E4 to Step E6 where the legacy device's camp-on procedure may continue following conventional techniques.

Thus in accordance with the principles of the process of FIG. 4C, a telecommunication system comprises two types of carrier for supporting two classes of device. The synchronisation procedures and MIB and CFI coding for both types of carrier are compatible with one another, but the procedures for acquiring system information required to complete a camp-on procedure, for example SIB1, are not compatible. Thus a first class of device can synchronise with both types of carrier and obtain carrier information, such as carrier bandwidth, system frame number, and an indicated control format for the two types of carrier, but the first class of device is unable to acquire system information, such as a Public Land Mobility Network (PLMN) identity list, for the carrier.

More generally, the above described techniques referred to as physical layer checks may be broadly characterised as techniques in which a telecommunication system comprises two types of carrier for supporting two classes of device in which at least an initial aspect of the physical layer signalling associated with the camp-on procedures for the respective carriers are compatible for the two types of carrier (for example, compatible synchronisation signalling), such that both classes of devices can at least begin a camp-on procedure for both types of carrier, but in which a subsequent aspect of the physical layer signalling associated with the camp-on procedures for the two types of carrier are not compatible (for example, PBCH, PCFICH or SIB1 acquisition) such that at least one of the classes of device is unable to camp-on to one of the types of network.

System Information Block 1 (SIB1) Checks for Carrier Selection by Legacy Devices:

The above described techniques referred to as physical layer checks are generally aimed at providing at least a partial degree of incompatibility between the two types of carrier at the level of the physical layer signalling. However, the following described group of techniques according to other embodiments of the invention assume legacy devices are able to successfully acquire SIB1 on DMN carriers and provides mechanisms for preventing a legacy device from completing the camp-on procedure based on SIB1 contents. These techniques are referred to here as SIB 1 checks. A potential advantage of some of the techniques based on SIB1 checks compared to some of the techniques based on physical layer checks discussed above is reduced latency. This is because some SIB1 techniques can in effect provide a legacy device with the ability to make a positive determination that it should discontinue its current camp-on procedure, whereas many of the physical layer based techniques are based on causing the legacy device to give up on its current camp-on procedure because something seems to have gone wrong. In some situations a legacy device might spend a relatively long time trying to camp-on a DMN carrier before giving up, e.g. because of a re-try schedule. This means it can in some cases be overall quicker to allow the legacy device to proceed further with an attempt to camp-on to a DMN carrier so it gets to a stage where it can in effect positively determine that it should terminate the camp-on procedure.

Thus in accordance with the following techniques it is assumed the DMN carrier supports physical layer signalling associated with acquiring SIB1 at least to an extent that allows a legacy device to acquire SIB1. In principle the DMN carrier may support this in addition to supporting a different camp-on procedure for DMN devices.

Once the contents of SIB1 have been decoded by a legacy device seeking to camp-on a carrier, the device can determine if the cell is barred, the PLMN identities in use and the details of any closed subscriber groups. Any of these pieces of information can be used by a DMN carrier as a mechanism to terminate the camp-on procedure of legacy devices, as described further below.

In halting an attempted camp-on procedure for legacy devices on a DMN carrier at this SIB1 stage, legacy devices can be made to terminate their camp-on procedure relatively early in the camp-on procedure. Not only can this benefit from faster termination of the camp-on procedure, no further legacy-compliant SIBs need be transmitted on the DMN carrier. Moreover, DMN specific SIBs can be transmitted in a format that does not need to be backwardly compatible (i.e. readable by legacy devices). Thus, with this approach, a DMN carrier might only provide limited legacy LTE functionality in specific sub-frames to provide a minimum amount of compatibility to allow legacy LTE devices to be able to read SIB1 (and decide to abandon the camp-on attempt). In this regard, this approach can in some ways be seen as providing a method of communicating a camp-on termination instruction to legacy devices for a DMN carrier that might operate in a substantially different way to a legacy carrier. For example, this could be achieved through the limited use of legacy carrier type downlink control (i.e. PDCCH) in the DMN carrier in order that the DMN carrier can contain a backwardly compatible SIB1 that can be acquired by legacy devices. Such legacy PDCCH signalling might only exist in sub-frames corresponding to those where SIB1 would be expected to exist in a legacy carrier. If in a given implementation a legacy device should be required to read further SIBs, then legacy PDCCH signalling might also be provided in the sub-frames in which those further SIBs exist. In sub-frames where legacy PDCCH signalling is provided for a DMN carrier, it may also be appropriate to include legacy-carrier type reference symbols, PCFICH and PHICH (in some cases for PHICH, only the location of the physical channel might be the same, while the contents could be different). In other sub-frames, i.e. in sub-frames which a legacy device does not need to read the carrier, there maybe no legacy PDCCH signalling on the DMN carrier. Sub-frames of a DMN carrier which include signalling providing a degree of compatibility with legacy devices/carriers, for example signalling relating to SIB1, may also include signalling that is not legacy device compatible. For example, a DMN carrier might include legacy-specific signalling and separate DMN-specific signalling within the same sub-frame.

One approach based upon SIB1 checks could be achieved by using cell barring such as employed in WCDMA MBSFN, and IMB MBSFN. Cell barring may be enabled by the setting of a flag in SIB1 on the DMN carrier. A legacy device seeking to camp-on a DMN carrier would thus determine the cell is barred for access and will terminate the camp-on procedure and perform cell reselection. However, a DMN device may be configured to ignore this form of cell barring indication so that a DMN device can proceed with the camp-on procedure. With this approach an additional cell barred indicator flag may be defined for DMN carriers to indicate to DMN devices whether or not the carrier is truly barred for access (since the DMN device will be configured to ignore the "conventional" cell-barred indicator).

Thus in accordance with an approach based on cell-barring, a telecommunication system comprises two types of carrier for supporting two classes of device, the first class of device at least is operable to acquire system information from both types of carrier, wherein the second type of carrier includes a cell-barred indicator for indicating to the first class of device whether or not the corresponding carrier is available for use, and wherein devices of the second class are configured to ignore the cell-barred indicator for indicating to the first class of device whether or not the corresponding carrier is available for use. The second type of carrier may include a further cell-barred indicator for indicating to the second class of device whether or not the corresponding carrier is available for use. That is to say, the second type of carrier may include separate cell-barred indicators for the two different classes of device.

Other approaches for terminating a camp-on procedure by a legacy device seeking to camp-on to a DMN carrier may be based on information contained within a USIM of the device, for example based on PLMN identities and/or closed subscriber group (CSG) definitions/membership.

For example, a legacy and a DMN carriers may be allocated different public land mobile network (PLMN) identities by their operator. The carriers could be configured to broadcast their respective PLMN ID(s) in the plmn-IdentityList IE of SIB1. In this scenario, DMN devices could be configured to be allowed access to the DMN carrier and legacy devices could be configured to not be allowed such access.

Another potential approach for in effect directing particular devices (e.g. legacy devices) to particular carriers (e.g. legacy carriers) is by making modified use of the principles underlying Closed Subscriber Groups (CSGs). Currently, within the 3GPP LTE framework there is the concept of CSGs. CSGs are maintained by a network operator through appropriate administration procedures. Each CSG is assigned a CSG identifier (CS_ID). Within a telecommunications system the relationship between subscribers and the CSGs they are allowed to access is held in subscription records at the HSS/HLR with identification being based on the IMSI of a terminal device's USIM. CSG_IDs can be added to individual terminal device records when the terminal device is assigned access to the corresponding CSGs.

The IDs of CSGs that a terminal device is allowed to access are recorded in the device's USIM. The CSG_IDs can be loaded onto the USIM either via Device Management procedures (e.g. Open Mobile Alliance Device Management (OMA DM)), or as a result of a manual search for CSGs and a resulting successful NAS procedure such as an Attach (during the Attach procedure the device's right to access the CSG is checked from the HSS subscriber record).

The primary intended use for CSGs in LTE Rel8/9/10 is to control access to so-called femtocells, such as Home (e)NodeBs. However, the present inventors have recognised that CSG-type functionality might also be used to control carrier selection more widely in a way that is not based on device identity (IMSI), but is based on the class of device.

In accordance with conventional CSG operation, a cell configured to act as a CSG cell is configured with the ID of the particular CSG. The cell broadcasts the CSG_ID in SIB1 along with an indicator to identify the cell/carrier as a CSG cell/carrier.

Terminal devices that are CSG aware, on reading the CSG indicator bit and CSG_ID in SIB1, will only attempt to RRC Connect and NAS Attach if that CSG_ID is in the terminal device's CSG Whitelist. Whether or not a particular CS_ID can be loaded into the device's CSG Whitelist is determined by the subscription data held at the HSS indexed by IMSI. Thus any terminal device into which the USIM corresponding to that subscriber identity (IMSI) is placed will have access to cells of the CSGs whose CSG_IDs are stored in the subscription record for that IMSI.

In accordance with an embodiment of the invention a modified CSG scheme is proposed in which a new CSG Device Type field is defined. This CSG Device Type field may be used to define the class of device allowed to access an associated carrier. The CSG Device Type parameter may be stored along with the conventional CSG_ID in the carrier subscription data. The CSG Device Type field could also be propagated into the CSG data stored in a DMN terminal device. Access to the carrier may then be limited according to the same principles as CSG_ID based control, but based on the CSG Device Type parameter instead. That is to say, only those devices seeking to camp-on a carrier which declare a device capability that corresponds to the CSG Device Type field (one such device type might, for example, be "DMN Device"). This aspect of a device's capability could be contained in the device capability information sent to the eNB and in the capability information sent to the Core Network so would be available for checking in both the Radio Access Network and the Core Network.

Thus a DMN device may be configured to check its device capability and any CSG_ID before attempting connection. The Core Network could also make the same check based upon the device capability sent by the terminal device and the CSG_ID/CSG Device Type stored in the subscription data at the HSS.

To explain the response of a legacy device seeking to camp-on a DMN carrier making use of this approach a particular scenario is assumed. Suppose a legacy device has a USIM associated with an IMSI number IMSI(1). Further suppose the subscriber data for IMSI(1) has been given access to a CSG with ID CSG_ID(1) and which has the CSG Device Type field set to "DMN Device". If the legacy device tries to attach via a carrier broadcasting CSG_ID(1), then the device will find CSG_ID(1) in its CSG Whitelist, and so will proceed to seek to camp-on and attempt to Attach. However, during the Attach procedure it will naturally not declare a device capability corresponding to the CSG Device Type of the carrier. The Core Network associated with the carrier then performs a subscription check against the CSG information provided by the legacy device and recognises that access to that CSG is reserved for devices declaring the capability "DMN device", and so access by the legacy device should be refused. The Core Network (using existing procedures) can thus send a NAS reject message with a particular reject cause value indicating "Not authorised for this CSG" to the legacy device. The legacy device is then required to remove that CSG_ID from its Allowed CSG List (Whitelist) stored in its USIM. Thus, if the legacy device re-attempts camp-on to a carrier with that CSG_ID, then the CSG_ID is no longer in its CSG Whitelist, and the terminal device will abort the camp-on attempt to that carrier, and will not even attempt to Attach through that cell.

Thus the introduction of a "Device Type" aspect to the CSG subscription information allows access to be based on a combination of USIM and class of device in that a given combination is only able to access the network through a CSG cell if (1) the CSG_ID is in the subscription data at the HSS, corresponding to the IMSI of the USIM; and (2) the device declares a device capability corresponding to that stored in the new CSG subscription data field "CSG Device Type".

Initial Access Checks for Carrier Selection by Legacy Devices:

Following acquisition of SIB1, a next phase of operation in LTE Rel8/9/10 conventional camp-on procedures is SIB2 acquisition and processing (scheduling information for SIB2 is broadcast in SIB1). In a telecommunications system in which DMN and legacy carriers are sufficiently compatible that a legacy device can acquire SIB1 from a DMN carrier and the legacy device is not caused to terminate the camp-on procedure based on the contents of SIB1, the acquisition and processing of SIB2 provides another stage at which legacy devices may be encouraged to cease the camp-on procedure for the current carrier.

For example, in accordance with LTE Rel8/9/10, SIB2 provides access class barring (ACB) parameters. A DMN carrier in accordance with an embodiment of the invention may be configured to include additional specialized ACB parameters which may be referred to as extended access barring (EAB) parameters. DMN devices may be configured to seek these EAB parameters, and if present, and applicable to the device, the EAB parameters may over-ride the ACB parameters. Legacy devices will only recognise the ACB parameters while DMN devices will also be able to read and interpret the EAB parameters. Thus if SIB2 of the DMN carrier contains both access class barring and extended access barring parameters, then the ACB parameters could be set to bar legacy devices, while the EAB parameters (which would be read by the DMN devices) could be set to allow access from the device.

The nature of access class barring is that it takes effect at the initial stage of RRC connection establishment when a terminal device is deciding whether it may attempt establishment. Accordingly, this type of approach for controlling legacy device camp-on procedures may be referred to as 'initial access checks'. If a terminal device determines it is barred when it performs initial access checks, e.g. based on ACB parameters in SIB2, then the device aborts the access attempt and refrains from making further access attempts for a given time period. Accordingly, this approach is able to prevent a legacy device from camping-on a DMN carrier, but further steps may be required to cause the legacy device to perform cell re-selection.

Summary Comments

Figure 5:
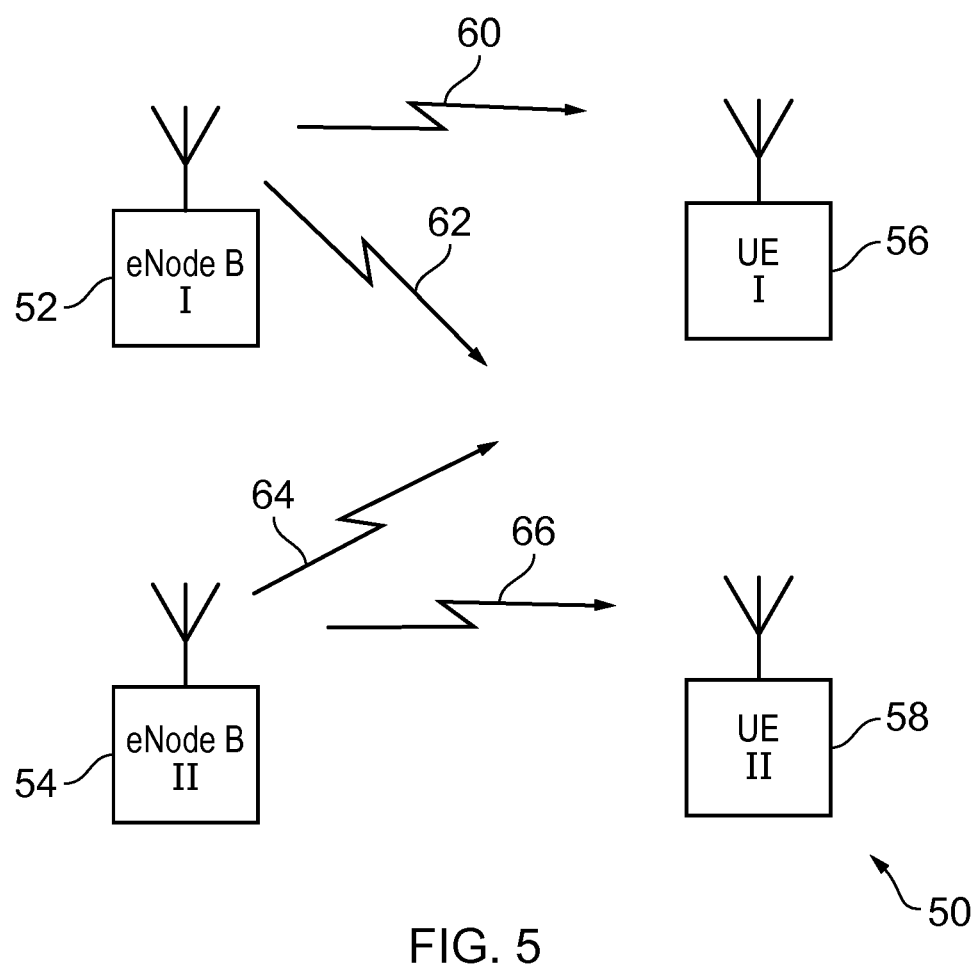
FIG. 5 schematically represents elements of a mobile telecommunications system for implementing embodiments of the invention.

FIG. 5 schematically represents elements of a mobile telecommunications system 50 for implementing any of the above described embodiments of the invention. The system comprises a first base station (eNodeB) 52 for communicating with a first terminal device (UE) 56 using a first carrier 60 and a second base station (eNodeB) 54 for communicating with a second terminal device (UE) 58 using a second carrier 66. As schematically shown in FIG. 5 by the element identified by reference numeral 62, the second terminal device/user equipment 58 is also able to receive the carrier 62 from the first base station/eNodeB 52 and as schematically shown in FIG. 5 by the element identified by reference numeral 64, the first terminal device/user equipment 56 is also able to receive the carrier 64 from the second base station/eNodeB 54. Thus the first base station 52, first carrier 60,62 and first terminal device 56 may be associated with a legacy network and the second base station 54, second carrier 64,66 and second terminal device 58 may be associated with a DMN network in accordance with embodiments of the invention and embodiments of the invention may be implemented by appropriately configuring the relevant elements of the system 50 to provide the above described functionality, for example, through appropriate software modification.

More generally, it will be appreciated that hardware for supporting the above-described different types of carrier may be broadly conventional except for the appropriate configuration changes, e.g. with regards scrambling/encoding procedures, to support the desired functionality for a given implementation. In some cases the first and second types of carrier may in essence be entirely independent of one another, for example, in effect two (or more) separate network architectures generally of the type shown in FIG. 1 may be deployed to support the two (or more) different types of carrier. In other examples, there may be a degree of, or complete, overlap in the hardware architecture supporting the multiple different types of carrier. For example, individual eNode-Bs of the kind shown in FIG. 1 may be configured to simultaneously support both carriers.

Thus a number of different techniques for controlling carrier selection by different classes of device at different stages of a camp-on procedure have been described. In particular it has been shown how a newer type of carrier supporting a newer type of device may be included in a telecommunications system in parallel with an older type of carrier supporting an older type of device, and how this may be done in a way which allows for a degree of compatibility between the older and newer types of carrier/device, while also allowing access to the newer type of carrier by the older type of device to be controlled without requiring changes to the defined behaviours for the older type of device, and also allowing access to the older type of carrier by the newer type of device to be controlled without requiring changes to the older type of carrier.

It will be appreciated that various modifications can be made to the embodiments described above without departing from the scope of the present invention as defined in the appended claims. In particular although embodiments of the invention have been described with reference to an LTE mobile radio network, it will be appreciated that the present invention can be applied to other forms of network such as GSM, 3G/UMTS, CDMA2000, etc. The term MTC terminal as used herein can be replaced with user equipment (UE), mobile communications device, mobile terminal etc. Furthermore, although the term base station has been used interchangeably with e-nodeB it should be understood that there is no difference in functionality between these network entities.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Holma H. and Toskala A, "*LTE for UMTS OFDMA and SC-FDMA based radio access*", John Wiley and Sons, 2009.

The invention claimed is:

1. A mobile communications system comprising:
an arrangement of at least one base station configured to communicate data to and/or from different types of terminal device via respective ones of a plurality of logically separate carriers of a wireless access interface;
a first terminal device operable to camp-on to a first carrier of the plurality of carriers and to subsequently communicate data with the arrangement of at least one base station via the first carrier, and
a second terminal device operable to camp-on to a second carrier of the plurality of carriers and to subsequently communicate data with the arrangement of at least one base station via the second carrier, wherein
the first and second carriers support compatible synchronisation signalling such that the first and second terminal devices both have the ability to synchronise with the first and second carriers to begin a camp-on procedure, and wherein following synchronisation with one of the first or second carriers to begin a camp-on procedure, the second terminal device is configured to determine whether or not to continue with the camp-on procedure in dependence on an aspect of physical layer signalling associated with a control channel of the carrier with which it has synchronised, and
the second device is configured to seek to synchronise with another carrier and begin another camp-on procedure in the event the second device determines to not continue with the camp-on procedure with the carrier with which it has synchronised.

2. The mobile communications system according to claim 1, wherein the control channel is a Physical Broadcast Channel.

3. The mobile communications system according to claim 1, wherein the aspect of physical layer signalling comprises the presence or absence of an indicator broadcast on the control channel.

4. The mobile communications system according to claim 3, wherein the second carrier is configured to broadcast the indicator and the first carrier is configured to not broadcast the indicator.

5. The mobile communications system according to claim 3, wherein the presence or absence of the indicator is derivable from a Master Information Block of the carrier with which the second device has synchronised.

6. The mobile communications system according to claim 5, wherein the presence or absence of the indicator is derivable from information contained within the Master Information Block.

7. The mobile communications system according to claim 5, wherein the presence or absence of the indicator is determined from signalling on a physical transmission resource derivable from the Master Information Block.

8. The mobile communications system according to claim 1, wherein the aspect of physical layer signalling comprises an indication of a carrier operating bandwidth for the carrier with which the second device has synchronised.

9. The mobile communications system according to claim 8, wherein the indication of the operating bandwidth of the carrier is derivable from a Master Information Block of the carrier with which the second device has synchronised.

10. A mobile communications system comprising:
an arrangement of at least one base station configured to communicate data to and/or from different types of terminal device via respective ones of a plurality of logically separate carriers of a wireless access interface;
a first terminal device operable to camp-on to a first carrier of the plurality of carriers and to subsequently communicate data with the arrangement of at least one base station via the first carrier, and
a second terminal device operable to camp-on to a second carrier of the plurality of carriers and to subsequently communicate data with the arrangement of at least one base station via the second carrier, wherein
the first and second carriers support compatible synchronisation signalling such that the first and second terminal devices both have the ability to synchronise with the first and second carriers to begin a camp-on procedure, and wherein following synchronisation with one of the first or second carriers to begin a camp-on procedure, the second terminal device is configured to determine whether or not to continue with the camp-on procedure in dependence on an aspect of physical layer signalling associated with a control channel of the carrier with which it has synchronized, the aspect of physical layer signalling comprises an indication of a carrier operating bandwidth for the carrier with which the second device has synchronized, and the second device is configured to not continue the camp-on procedure if the carrier operating bandwidth is greater than a device operating bandwidth for the second device.

11. The mobile communications system according to claim 10, wherein the control channel is a Physical Broadcast Channel.

12. The mobile communications system according to claim 10, wherein the aspect of physical layer signalling comprises the presence or absence of an indicator broadcast on the control channel.

13. The mobile communications system according to claim 12, wherein the second carrier is configured to broadcast the indicator and the first carrier is configured to not broadcast the indicator.

14. The mobile communications system according to claim 12, wherein the presence or absence of the indicator is derivable from a Master Information Block of the carrier with which the second device has synchronised.

15. A mobile communications system according to claim 14, wherein the presence or absence of the indicator is derivable from information contained within the Master Information Block.

16. The mobile communications system according to claim 14, wherein the presence or absence of the indicator is determined from signalling on a physical transmission resource derivable from the Master Information Block.

17. The mobile communications system according to claim 10, wherein the aspect of physical layer signalling comprises an indication of a carrier operating bandwidth for the carrier with which the second device has synchronised.

18. The mobile communications system according to claim 17, wherein the indication of the operating bandwidth of the carrier is derivable from a Master Information Block of the carrier with which the second device has synchronised.

19. A mobile communications system comprising:

an arrangement of at least one base station configured to communicate data to and/or from different types of terminal device via respective ones of a plurality of logically separate carriers of a wireless access interface;

a first terminal device operable to camp-on to a first carrier of the plurality of carriers and to subsequently communicate data with the arrangement of at least one base station via the first carrier, and a second terminal device operable to camp-on to a second carrier of the plurality of carriers and to subsequently communicate data with the arrangement of at least one base station via the second carrier, wherein the first and second carriers support compatible synchronisation signalling such that the first and second terminal devices both have the ability to synchronise with the first and second carriers to begin a camp-on procedure, and wherein following synchronisation with one of the first or second carriers to begin a camp-on procedure, the second terminal device is configured to determine whether or not to continue with the camp-on procedure in dependence on an aspect of physical layer signalling associated with a control channel of the carrier with which it has synchronized, and the first and second carriers employ incompatible physical layer signalling associated with control channels of their respective camp-on procedures such that the first terminal device is unable to complete a camp-on procedure with the second carrier.

\* \* \* \* \*